United States Patent [19]

Arima et al.

[11] Patent Number: 4,897,514
[45] Date of Patent: Jan. 30, 1990

[54] DISTRIBUTOR CAP FOR AN IGNITION DISTRIBUTOR FOR AN INTERNAL COMBUSTION ENGINE

[75] Inventors: Kouji Arima; Masaaki Chiba; Toshiro Ota, all of Himeji, Japan

[73] Assignee: Mitsubishi Denki Kabushiki Kaisha, Tokyo, Japan

[21] Appl. No.: 341,601

[22] Filed: Apr. 21, 1989

[30] Foreign Application Priority Data

Apr. 22, 1988 [JP] Japan .................................. 63-98232

[51] Int. Cl.$^4$ ........................ F02P 7/02; H01H 19/00
[52] U.S. Cl. ............................................... 200/19 DC
[58] Field of Search .......... 200/19 R, 19 DC, 19 DR, 200/26, 19 A, 24; 123/146.5 A

[56] References Cited

U.S. PATENT DOCUMENTS

| | | |
|---|---|---|
| 2,365,925 | 12/1944 | Zoerlein et al. .............. 200/19 DC |
| 3,435,161 | 3/1969 | Webster ............................. 200/26 |
| 4,710,598 | 12/1987 | McAbee et al. .......... 200/19 DC X |

FOREIGN PATENT DOCUMENTS 58-66175  5/1983  Japan .

Primary Examiner—J. R. Scott
Attorney, Agent, or Firm—Sughrue, Mion, Zinn, Macpeak & Seas

[57] ABSTRACT

A distributor cap has external terminals 23, 24 and inner electrodes 25, 26 disposed on a cap main body, and electrical conductors 28, 35 are embedded in the cap main body for sequential power distribution by a rotor of the distributor. Some of the conductors are coated with electrically insulating sheath members 36 which have insulating bridge members 38 bridging the sheath members on adjacent ones of the conductors. The bridge members have formed thereon positioning projections 37 for limiting the movement of the conductors out of predetermined positions during the molding of the cap body, whereby substantially no surface discharge occurs.

3 Claims, 2 Drawing Sheets

DISTRIBUTOR CAP FOR AN IGNITION DISTRIBUTOR FOR AN INTERNAL COMBUSTION ENGINE

BACKGROUND OF THE INVENTION

This invention relates to a distributor cap for an ignition distributor for an internal combustion engine.

FIG. 1 is a bottom view of a conventional distributor cap 1 for use with an internal combustion engine of six cylinders, FIG. 2 is a sectional view of the distributor cap 1 taken along line 2—2 of FIG. 1, and FIG. 3 is a side view of an assembly of two electrodes and a conductor assembly connected therebetween.

In FIGS. 1 to 3, the conventional distributor cap 1 comprises a molded cap main body 2, a plurality of external terminals inclucing an input terminal 3 and output terminals 4 disposed on the cap main body 2 so as to be connectable to an external circuit (not shown) such as an ignition coil and spark plugs. The distributor cap 1 also comprises a plurality of inner electrodes including a central electrode 5 and six circumferential electrodes 6 disposed inside of the cap main body 2 for sequential power distribution by a contact rotor of the distributor (not shown). The external terminals 3 and 4 are connected to inner electrodes 5 and 6 by electrical conductor assemblies 8 and 9–14 respectively embedded within the cap main body 2 for electrically connecting said external terminals to said electrodes. The conductor assemblies 8–14 each have an electrical conductor 15 connecting the external terminals 3 and 4 to the inner electrodes 5 and 6. Some of the conductors 15 have formed thereon an electrically insulating sheath member 16, which are cast-molded resin layers on the conductors 15.

Each of the insulating sheath members 16 has integrally formed thereon at least one positioning projection 17 integrally extending from the sheath member 16. The positioning projections 17 disposed on the sheath members 16 are for limiting the movement of the conductors 15 from designed, predetermined positions during the cast-molding of the molded cap main body 2. Therefore, the positioning projections 17 extend substantially perpendicularly to the plane of rotation of the contact rotor. The length of the positioning projections 17 should be sufficiently long during the cast-molding operation of the cap main body 2 so that their tips may engage respective positioning holes formed on the mold and prevent undesirable shifts of the conductors 15. After the cast-molding has been completed, the tips projecting from the mold-formed surface of the cap main body 2 must be cut and removed.

Since the projecting tips of the positioning projections 17 are most preferably cut and removed at the last stage of manufacture of the distributor cap 1, a mechanical stress applied to the positioning projections 17 during the cutting operation sometimes causes separation at the interface between the cast-mold cap main body 2 and the positioning projections 17. Also, since the positioning projections 17 of the conventional distributor cap 1 are arranged so that their central axes intersect with the axes of the respective electrical conductors 15, the positioning projections 17 are located at a position relatively close to the respective electrical conductors 15. Therefore, if the above-mentioned separation at the interface between the positioning projections 17 and the cap main body 2 occurs, a creeping discharge can easily take place at the separated interface, degrading the reliability and the life of the distributor.

SUMMARY OF THE INVENTION

Accordingly, the primary object of the present invention is to provide a distributor cap for a distributor for use with an internal combustion engine which is free from the above-discussed problems of the conventional distributor cap.

Another object of the present invention is to provide a distributor cap for a distributor for use with an internal combustion engine that is reliable.

Another object of the present invention is to provide a distributor cap for a distributor for use with an internal combustion engine that has a long operating life.

With the above objects in view, the distributor cap of the present invention is for use with an internal combustion engine ignition distributor which includes a contact rotor rotatable in a plane. The distributor cap comprises a cast-molded cap main body, a plurality of external terminals embedded within the cap main body and connectable to an external circuit such as an ignition coil and spark plugs, a plurality of electrodes disposed inside of the cap main body for sequential power distribution by the contact rotor of the distributor, and electrical conductor assemblies embedded within the cap main body and electrically connecting the external terminals to the electrodes. The distributor cap further comprises a positioning projection disposed on each conductor asssembly for limiting the movement of the conductor assembly out of its designed, predetermined position during the cast-molding of the mold cap main body. The positioning projection extends substantially perpendicularly to the plane of rotation of the contact rotor from the conductor means, and the positioning projection is located remote from the conductor assembly. The conductor assembly may comprise a plurality of electrical conductors, electrically insulating sheath members disposed on the conductors, and an electrically insulating bridge member connected between the sheath members on adjacent ones of the conductors, and the positioning projection may be supported by the insulating bridge member.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
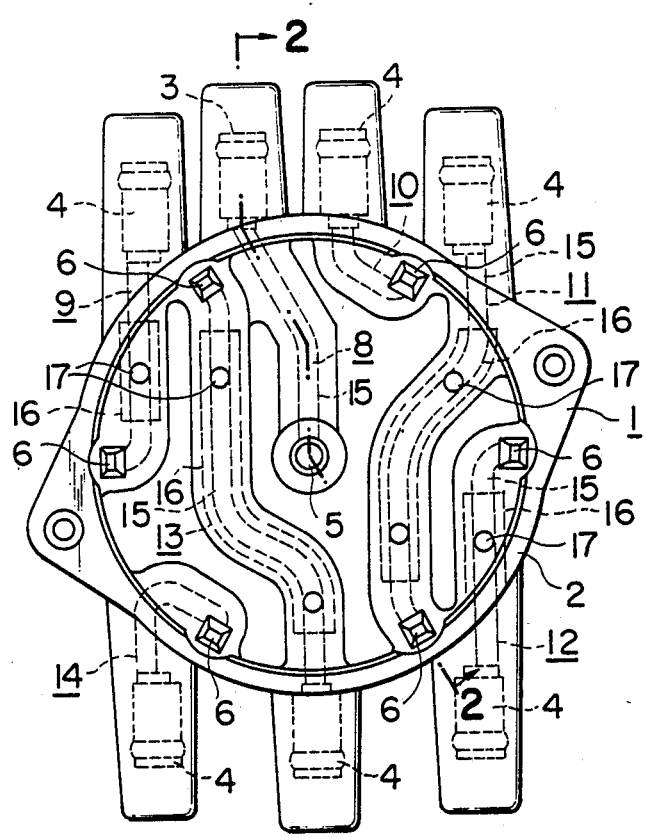
FIG. 1 is a bottom view of the conventional distributor cap for use with an internal combustion engine of six cylinders.
Figure 2:
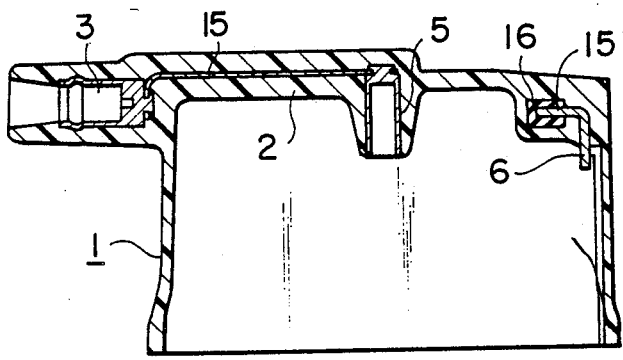
FIG. 2 is a sectional view of the conventional distributor cap taken along line 2—2 of FIG. 1.
Figure 3:
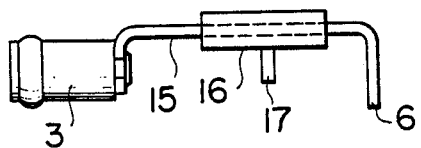
FIG. 3 is a side view of an assembly of two electrodes and a conductor assembly connected therebetween.
Figure 4:
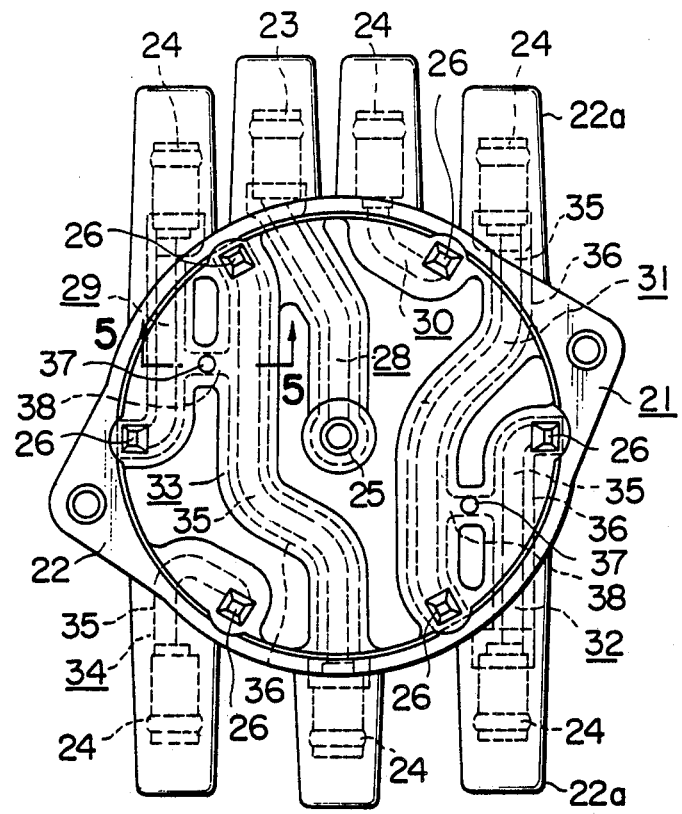
FIG. 4 is a bottom view of the distributor cap for use with an internal combustion engine of six cylinders constructed in accordance with the present invention.
Figure 5:
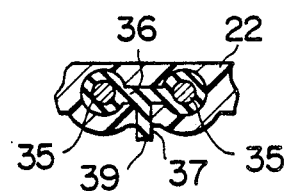
FIG. 5 is a fragmental sectional view of the distributor cap taken along line 5—5 of FIG. 4.

FIG. 4 is a bottom view of a distributor cap 21 embodying the invention for use with an internal combustion engine of six cylinders, and FIG. 5 is a sectional view of the distributor cap 21 taken along line 5—5 of FIG. 4. In FIGS. 4 and 5, the distributor cap 21 has a similar structre to that of the conventional distributor cap 1 shown and described in conjunction with FIGS. 1 to 3 and comprises a substantially cup-shaped cast-molded cap main body 22 made of a suitable electrically insulating cast-mold resin.

The distributor cap 21 also comprises one input terminal 23 and six output terminals 24 embedded within the mold cap main body 22 around the circumference of its closed end. Since these input and output terminals 23 and 24 are connectable to an external circuit such as an ignition coil (not shown) or spark plugs (not shown), they are referred to as external terminals. Each of the external terminals 23 and 24 are arranged in parallel to each other and supported and covered by an electrically insulating tubular member 22a integrally formed on the cap main body 22.

The distributor cap 21 also comprises a central electrode 25 for supplying electrical power to a rotor (not shown) of the distributor. The central electrode 25 is embedded within the cap main body 22. The cap 21 further comprises six circumferential electrodes 26 embedded in the cap main body 22 and positioned close to the cylindrical wall of the cup-shaped cap main body 22. The circumferential electrodes 26 are projected and exposed at equal intervals along the inner circumference of the cap main body 22. The circumferential electrodes 26 are electrodes into which the electrical power supplied into the distributor rotor (not shown) is supplied when the tip of the rotating rotor sequentially comes close to the circumferential electrodes 26, thereby sequentially distributing the power to the spark plugs (not shown). Thus, these central and circumferential electrodes may be referred to as electrodes disposed inside of the cap main body for sequential power distribution by the contact rotor of the distributor.

The distributor cap 21 further comprises a plurality of electrical conductor assemblies 28–34 embedded within the cast-molded cap main body 22 for individually electrically connecting the external terminals 23 and 24 to the inner electrodes 25 and 26, respectively. The input external terminal 23 is connected to the central electrode 25 by the electrical conductor assembly 28 embedded within the molded cap main body 22. The output external terminals 24 are connected to the circumferential electrodes 26 by the respective conductor assemblies 29–34 each embedded within and extending through the molded cap main body 22. It is seen that while some of the electrical conductor assemblies 28–34 such as the conductor assemblies 30 and 34 comprise an electrical conductor 35 alone, other electrical conductor assemblies 28, 29, and 31–33 comprise an electrical conductor 35 and an electrically insulating sheath member 36 disposed on the conductor 35.

The insulating sheath members 36 of the conductor assemblies 29, 33 and 31, 32 have integrally formed thereon positioning projections 37. The positioning projections 37 are for limiting the movement of the conductor assemblies from a designed, predetermined position during the cast-molding of the molded cap main body 22. Therefore, the positioning projections 37 extend substantially perpendicularly to the plane of rotation of the contact rotor (not shown). According to the present invention, the positioning projections 37 are not directly formed on the insulating sheath members 36, but are integrally formed on electrically insulating bridge members 38 which integrally connect the insulating sheath members 36 on at least some of the adjacent conductors 35 as best seen from FIG. 5. thus, the axes of the positioning projections 37 do not intersect the axes of the respective electrical conductors 35 as is the case in the conventional design, and the positioning projections 37 are located relatively remote from the electrical conductors as contrasted with the FIG. 1 construction where they directly underlie the conductors.

The length of the positioning projections 37 should be sufficiently long during the cast-molding operation of the cap main body 22 so that their tips 39 can engage the respective positioning holes (not shown) formed on the mold (not shown) and prevent undesirable shifts of the conductors 35 within the mold during cast-molding. After the cast-molding has been completed, the tips 39 projecting from the mold-formed surface of the cap main body 22 are preferably cut and removed.

With the above described arrangement, even when a separation at the interface between the cast-mold cap main body 22 and the positioning projections 37 takes place due to a mechanical stress applied to the positioning projections 37 during their cutting, since the positioning projections 37 of the distributor cap 21 of the present invention are positioned remotely from the electrical conductors 35 and arranged so that their central axes do not intersect with the axes of the respective electrical conductors 35, a long surface discharge distance and a large insulating resistance are provided, and substantially no surface discharge takes place at this separated interface, improving the reliability and the life of the distributor. Thus, a distributor cap which is free from the problems of the conventional distributor cap and which is reliable and of long operating life has been provided.

What is claimed is:

1. A distributor cap for an internal combustion engine ignition distributor adapted to include a contact rotor rotatable in a plane, comprising:
   a molded cap main body (22);
   a plurality of external terminals (23, 24) disposed on said cap main body and connectable to external circuits;
   a plurality of electrodes (25, 26) disposed inside of said cap main body for sequential power distribution by the contact rotor of the distributor;
   a plurality of electrical conductor means (28–34) disposed within said cap main body for individually electrically connecting said external terminals to said electrodes;
   electrical insulation means (38) for laterally interconnecting selected ones of said conductor means, and
   positioning projections means (37) disposed on said insulation means for limiting the movement of said selected conductor means from a predetermined position during the molding of said cap main body, said positioning projection means extending substantially perpendicularly to the plane of rotation of the contact rotor, and said positioning projection means being located such that axes thereof do not intersect axes of said conductor means.

2. A distributor cap as claimed in claim 1, wherein said conductor means each comprises an electrical conductor (35), said electrical insulation means comprises sheath member means (36) disposed on said selected conductor means, and said positioning projection means integrally extends from said sheath member means.

3. A distributor cap as claimed in claim 2, wherein said electrical insulation means comprises bridge members connected between adjacent sheath member means, and said positioning projection means are individually supported by said bridge members.

* * * * *